(12) United States Patent
Kromer

(10) Patent No.: US 7,290,121 B2
(45) Date of Patent: Oct. 30, 2007

(54) METHOD AND DATA PROCESSOR WITH REDUCED STALLING DUE TO OPERAND DEPENDENCIES

(75) Inventor: Stephen Charles Kromer, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 505 days.

(21) Appl. No.: 10/461,129

(22) Filed: Jun. 12, 2003

(65) Prior Publication Data

US 2004/0255099 A1  Dec. 16, 2004

(51) Int. Cl.
*G06F 9/30* (2006.01)
*G06F 9/302* (2006.01)

(52) U.S. Cl. .................. 712/219; 712/221; 712/226
(58) Field of Classification Search ............ 712/219, 712/221, 226
See application file for complete search history.

(56) References Cited

U.S. PATENT DOCUMENTS

| | | | |
|---|---|---|---|
| 4,594,655 A * | 6/1986 | Hao et al. | 712/218 |
| 4,734,852 A | 3/1988 | Johnson et al. | |
| 5,128,890 A | 7/1992 | Girardeau, Jr. | |
| 5,488,729 A * | 1/1996 | Vegesna et al. | 712/209 |
| 5,838,941 A * | 11/1998 | Valentine et al. | 712/217 |
| 5,887,160 A * | 3/1999 | Lauritzen et al. | 712/222 |
| 5,893,928 A | 4/1999 | Gravenstein et al. | |
| 6,145,074 A * | 11/2000 | Asato | 712/218 |
| 6,256,721 B1 | 7/2001 | Witt | |
| 6,430,679 B1 * | 8/2002 | Heeb | 712/218 |
| 6,857,060 B2 * | 2/2005 | Elias et al. | 712/217 |

FOREIGN PATENT DOCUMENTS

EP 0 518 469 A2 12/1992

OTHER PUBLICATIONS

Patterson, David and Hennessy, John. "Computer Architecture: A Quantitative Approach". Third Edition, Morgan Kaufmann Publishers. May 17, 2002. pp. 182-196.*
"Putting the Fill Unit to Work: Dynamic Optimizations for Trace Cache Microprocessors," Friendly et al., University of Michigan, Dept. of Electrical Engineering and Computer Science, XP-000871939, ISBN-0-8186-8609-X, Nov. 30, 1998, pp. 173-181.

* cited by examiner

*Primary Examiner*—Eddie Chan
*Assistant Examiner*—Robert Fennema

(57) ABSTRACT

A data processor (200) has a pipelined execution unit (120). Whether a first instruction is one of a class of instructions wherein as a result of execution of the first instruction the contents of an operand register will be stored in a destination register is determined. A second instruction that references the destination register is received before a completion of execution of the first instruction. The second instruction is executed using the contents of the operand register without stalling the second instruction in the pipelined execution unit (120).

15 Claims, 3 Drawing Sheets

METHOD AND DATA PROCESSOR WITH REDUCED STALLING DUE TO OPERAND DEPENDENCIES

TECHNICAL FIELD OF THE INVENTION

The present invention generally relates to data processors, and more particularly to pipelined data processors.

BACKGROUND OF THE INVENTION

Some data processors use a technique known as pipelining for higher performance. Pipelining is a technique that breaks down the instruction processing task into smaller, modular sub-tasks each of which can be performed during a particular atomic period of time known as a pipeline cycle. By breaking down the task into these smaller cycles data processors can, for example, be fetching one instruction while executing another and while writing back the results of a third instruction into the register file. Thus even though individual instructions may take several cycles to complete, the overall throughput can approach one instruction per pipeline cycle.

Modern microprocessors have more sophisticated pipelines than this three-stage example. For example, a five-stage pipeline may include fetch, decode, operand access, execute, and writeback stages. The longer the pipeline, the more complicated the data processing instruction can be while still maintaining the throughput close to one instruction per cycle.

A problem arises, however, when certain sequences of instructions occur. A particular sequence of instructions may cause what is known as a pipeline dependency. One type of pipeline dependency, known as an operand dependency, occurs when one instruction cannot be executed until the result of execution of a previous instruction is available. For example, assume the instruction sequence:

ADD R2, R0, R1
ADD R3, R1, R2 in which the first register is the destination of the result, and the second and third registers store the input operands. Since R2 is the destination register of the first ADD instruction, the execution of the second ADD instruction depends on the outcome of the first ADD instruction and cannot occur until the results of the first ADD instruction are known.

Another type of dependency is known as a load dependency. For example, assume the instruction sequence:

MOV R0, (R1)
ADD R3, R0, R2

In this sequence, the first instruction loads register R0 with the contents of memory pointed to by the address stored in register R1. Obviously correct execution of the ADD instruction depends on the new value of register R0 being available.

Mike Johnson et al. in U.S. Pat. No. 4,734,852 disclose a method in which a bypass path can be used to forward the results of an earlier memory load operation to a subsequent instruction without having to first write it to the destination register in the register file and then read it from the register file. Thus the new register value is available much earlier and the pipeline stall time after a load dependency can be minimized.

However in some data processors which have deep execution pipelines it would require significant additional circuit area to add bypass paths from every pipeline stage that produces results to the input of the pipeline to forward intermediate results so that new instructions can issue earlier. This is especially true in floating point execution units in which the operand may be, for example, 64 bits long. Furthermore some results are simply not available until the instruction has reached the end of the pipeline.

Accordingly, it would be desirable to take advantage of additional opportunities for reducing the negative impact of dependencies without adding excessive circuit area. These and other desirable features and characteristics of the present invention will become apparent from the subsequent detailed description and the appended claims, taken in conjunction with the accompanying drawings and the foregoing technical field and background.

BRIEF SUMMARY OF THE INVENTION

A method is provided for use in a data processor having a pipelined execution unit. Whether a first instruction is one of a class of instructions wherein as a result of execution of the first instruction the contents of an operand register will be stored in a destination register is determined. A second instruction that references the destination register is received before a completion of execution of the first instruction. The second instruction is executed using the contents of the operand register without stalling the second instruction in the pipelined execution unit.

A data processor is also provided that includes an issue logic circuit, a register file, a pipelined execution unit, and a redirect logic circuit. The issue logic circuit has an output for providing first and second instructions in sequence, each instruction having at least an opcode, a first operand register identifier for a first operand, and a destination register identifier for a destination register. The register file has a read port including a read address input and a read data output, and a write port. The pipelined execution unit has a first input coupled to the output of the issue logic circuit, a second input coupled to the read data output of the register file, and an output coupled to the write port of the register file. The redirect logic circuit has a first input coupled to the output of the issue logic circuit, a second input coupled to the read data output of the register file, and an output coupled to the read address input of the register file for selectively substituting the first operand register identifier of the first instruction for the first operand register identifier of the second instruction.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
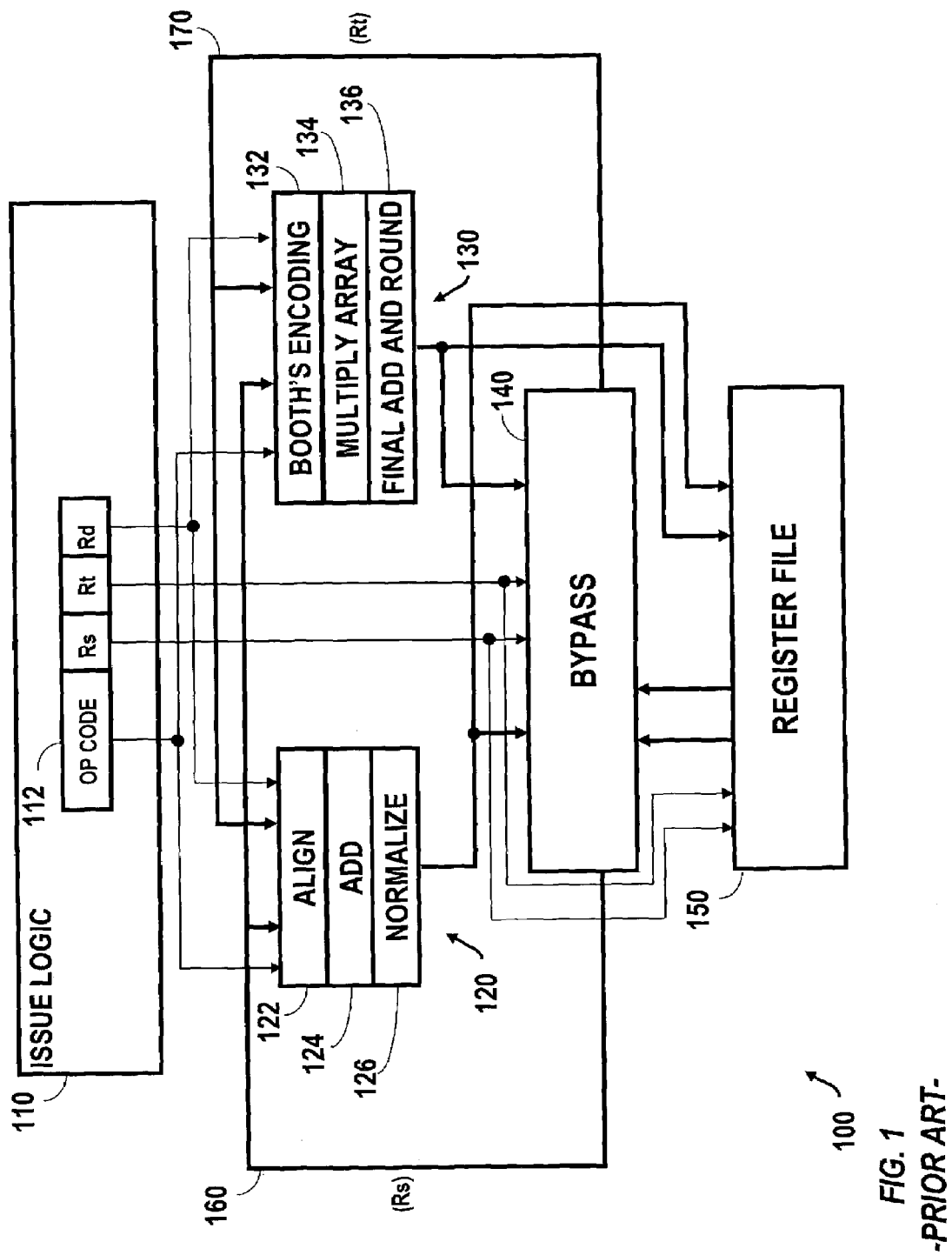
FIG. 1 illustrates a block diagram of a pipelined execution unit of a data processor known in the prior art.

FIG. 1 illustrates a block diagram of a pipelined execution unit 100 of a data processor known in the prior art. Execution unit 100 is a floating point unit having an add unit 120, a multiply unit 130, and a floating point register file 150. An issue logic circuit 110 is responsible for issuing instructions to add unit 120 and multiply unit 130. In general instructions such as instruction 112 include an op code field labeled "OP CODE", a first operand register identifier labeled "Rs", a second operand register identifier labeled "Rt", and a destination register identifier labeled "Rd". For some particular instructions in the instruction set the Rt field may be absent or there may be an optional immediate operand field, but these other instructions do not affect the operation of the redirection mechanism to be described below ad will not be discussed further.

Execution unit 100 is a single-issue execution unit, so issue logic 110 issues one instruction per pipeline cycle and provides the instruction to either add unit 120 or multiply unit 130 based on the type of instruction. Add unit 120 has three pipeline stages: an align stage 122, an add stage 124, and a normalize stage 126. Multiply unit 130 also has three stages: a Booth's encoding stage 132, a multiply array stage 134, and a final add and round stage 136.

Instructions issued to add unit 120 or multiply unit 130 proceed down their respective pipelines and advance by one stage at the end of each pipeline cycle. Input operands are provided to the first stage of the selected unit as follows. The Rs and Rt fields of instruction 112 are output by issue logic 110 to both a bypass circuit 140 and register file 150. If there are no operand dependencies, then operands Rs and Rt are returned from register file 150, through bypass circuit 140, onto buses 160 and 170. If there are operand dependencies based on instructions just completing in the last pipeline stages, then they are received by bypass circuit 140 and forwarded to the appropriate operand buses. If there are one or more dependencies with previous instructions that have not yet completed, then issue logic 110 stalls the issuance of the new instruction until the previous instruction, on which the new instructions depends, completes processing. In this case when the previous instruction that caused the dependency is finally complete, the results pass through bypass circuit 140 onto buses 160 and 170 to allow the stalled new instruction to be issued. In parallel bypass circuit 140 writes the new value to register file 150.

In cases in which there is an operand dependency based on an instruction in one of the first two pipeline stages, the issuance of the new instruction is stalled until the previous instruction completes. This stalling results in hardware being left idle and performing no useful work. It would be desirable to reduce the number of occurrences of this type of stalling or to correct it when it does happen.

For example the align stage of add unit 120 has inputs for receiving the first and second operand values through operand buses 160 and 170, respectively. These values, the OP CODE, the destination register designator Rd, and various other decoded or partially decoded fields advance through the pipeline stages. When an instruction has been processed through normalize stage 126, it is provided to an input of a bypass circuit 140. Bypass circuit 140 is included to provide a path between the results of a previous instruction and the input of a subsequent instruction to save a pipeline cycle that would otherwise be required to write the result into the destination register in register file 150 and subsequently read it out.

Figure 2:
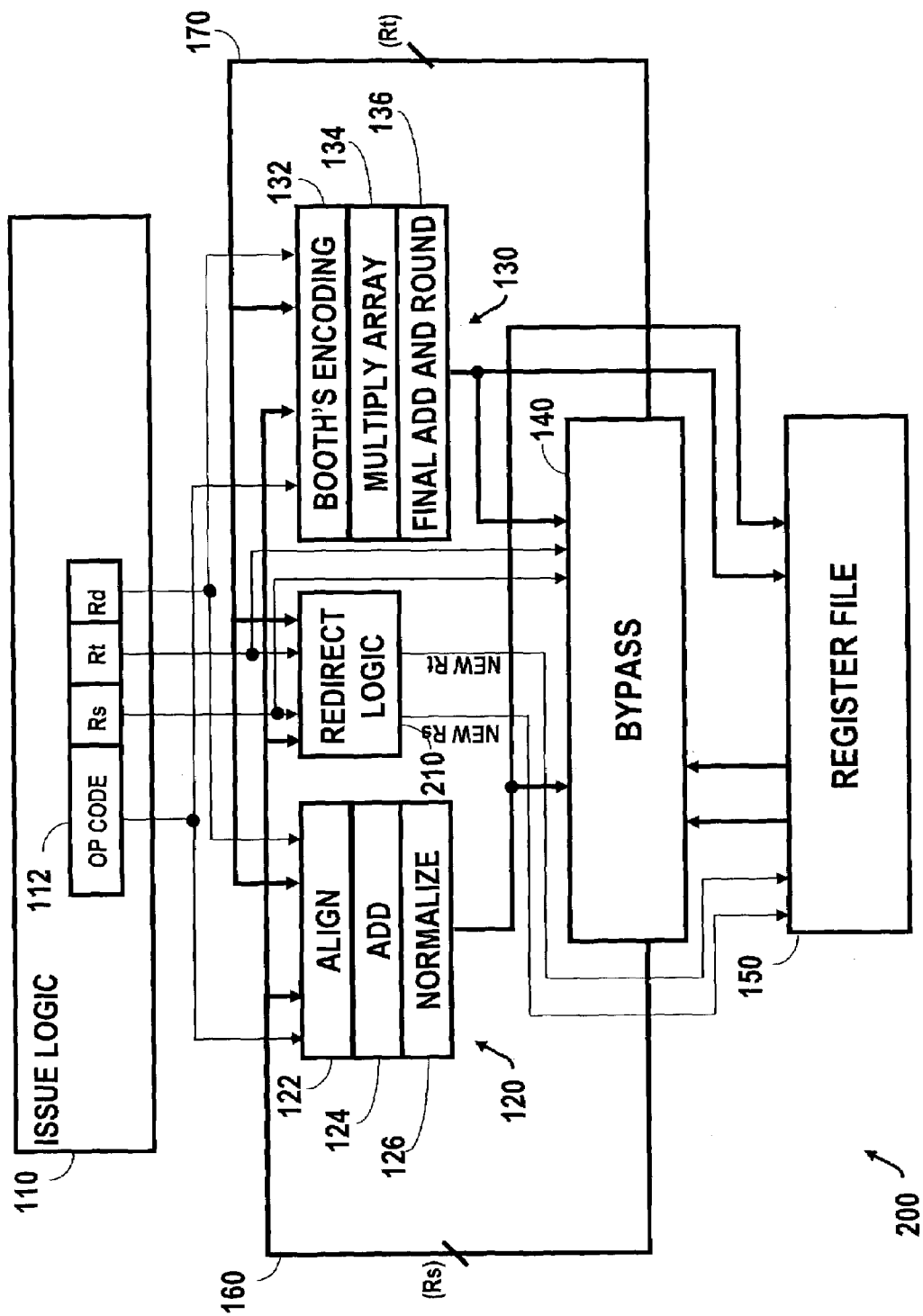
FIG. 2 illustrates a block diagram of a pipelined execution unit of a data processor according to the present invention.

FIG. 2 illustrates a block diagram of a pipelined execution unit 200 of a data processor according to the present invention. As in FIG. 1 execution unit 200 is a floating point unit but could be any other type of execution unit such as integer, vector, etc. Execution unit 200 is similar to execution unit 100 of FIG. 1 except it includes a redirect logic circuit 210 that, in conjunction with other elements of execution unit 200, prevents a class of instructions that can cause operand dependencies from stalling the pipeline. Redirect logic circuit 210 detects several types of instructions that would ordinarily cause register dependencies, and corrects them by substituting register identifiers that provide the correct result.

The first type of instruction is a register-to-register move instruction followed by another instruction that uses the destination register of the register-to-register move instruction as an operand register. For example, assume the instruction sequence:

MOV R1, R0
ADD R3, R2, R1 wherein the first instruction signifies a move operation in which the contents of register R0 are moved into register R1, and the second instruction signifies an add operation in which the contents of R1 are added to the contents of R2, the sum of which is placed into register R3. In known systems this sequence causes a dependency that prevents the ADD instruction from being issued until the results of the MOV instruction are available, either in the register file or in bypass circuit 140. Execution unit 200 actually executes the MOV instruction using add unit 120 by performing an equivalent add operation that uses the value of zero for the second operand. Thus the second instruction would normally need to wait until normalize stage 126 provides the result to bypass circuit 140. However in execution unit 200, redirect logic circuit 210 causes the contents of R0 to be substituted for the contents of R1 in the ADD instruction and the ADD instruction to be issued immediately, using as a second operand the contents of R0. Thus the ADD instruction executes correctly.

The second type of instruction is an ADD instruction in which one of the operands is equal to zero followed by another instruction that uses the destination register of the add instruction as an operand register. For example, assume the instruction sequence:

ADD R2, R1, R0
ADD R4, R3, R2 wherein the first ADD instruction signifies an add operation in which the contents of register R0 are added to the contents of register R1 and the sum is stored in register R2, and the second ADD instruction signifies an add operation in which the contents of R2 are added to the contents of R3 and the sum is stored in register R4. In known systems this sequence causes a dependency that prevents the second ADD instruction from being issued until the results of the first ADD instruction are available. However in execution unit 200, in the case in which R1 (R0)=0, redirect logic circuit 210 causes the contents of R0 (R1) to be substituted for the contents of R2 in the second ADD instruction and the second ADD instruction to be issued immediately, using as a second operand the contents of R0 (R1).

The third type of instruction is a multiply instruction in which one of the operands is equal to one followed by another instruction that uses the destination register of the multiply instruction as an operand register. For example, assume the instruction sequence:

MUL R2, R1, R0
ADD R4, R3, R2 wherein the first instruction signifies a multiply operation in which the contents of register R0 are multiplied by the contents of register R1 and the product is stored into register R2, and the second instruction signifies an add operation in which the contents of register R2 are added to the contents of register R3 and placed into register R4. In known systems this sequence causes a dependency that prevents the ADD instruction from being issued until the results of the MUL instruction are available. However in execution unit 200, in the case in which R1 (R0)=1, redirect logic circuit 210 causes the contents of R0 (R1) to be substituted for the contents of R2 in the ADD instruction and the ADD instruction to be issued immediately, using as a second operand the contents of R0 (R1).

In all these instruction sequences known execution units stall the issuance of the second instruction until the results of the first instruction are available for forwarding. However execution unit 200 recognizes these conditions to substitute a register for the register actually referenced and allow the instruction to be issued immediately. A data processor using such an execution unit will process a given section of code in less time or, alternatively, impose fewer restrictions on the compiler that issues the instructions.

Execution unit 200 performs further register substitution to prevent pipeline stalls by recognizing certain other instructions that can be issued by substituting a register for a referenced register and forcing a change in the sign bit of the result. Operands are processed in execution unit 200 in one of two formats. The first format is IEEE normal (32-bit) floating point format, in which a number is represented by one sign bit, eight exponent bits, and twenty-three fraction bits. The second format is IEEE double precision (64-bit) format, in which a number is represented by one sign bit, eleven exponent bits, and fifty-two fraction bits. Since these numbers have an explicit sign bit, if R0=0 and the sign bit of R1 is negative, the second instruction in the sequence

ADD R2, R1, R0
ADD R4, R3, R2 can be issued by using R1 for the second operand and setting the sign bit of the result to 1 to signify a negative number.

This feature allows additional instructions to be included in the set of instructions that redirect logic circuit 210 is responsive to. Such instructions include ABS, which takes the absolute value of a number, and NEG, which negates or changes the sign bit of a number. For these two instructions, redirect logic circuit 210 implements a mechanism that changes the value of the sign bit when an operand has been substituted as appropriate. Other instructions for which redirect logic circuit 210 changes the value of the sign bit include a subtract instruction in which the minuend (i.e., A in the expression A−B) is zero, and a multiply instruction in which either operand is equal to negative one. A subtract instruction in which the subtrahend (i.e., B in the expression A−B) is zero is equivalent to an ADD to zero instruction and in this case redirect logic circuit 210 will substitute the first operand for the destination operand without changing the sign bit. A multiply instruction in which one operand is zero will produce a zero result and in this case redirect logic circuit 210 substitutes the zero operand register for the destination register. Note that this list of instructions is not exhaustive. Other instructions unique to the data processor's particular instruction set can be incorporated in the set of instructions that redirect logic circuit 210 is responsive to according to the principles set forth herein.

Figure 3:
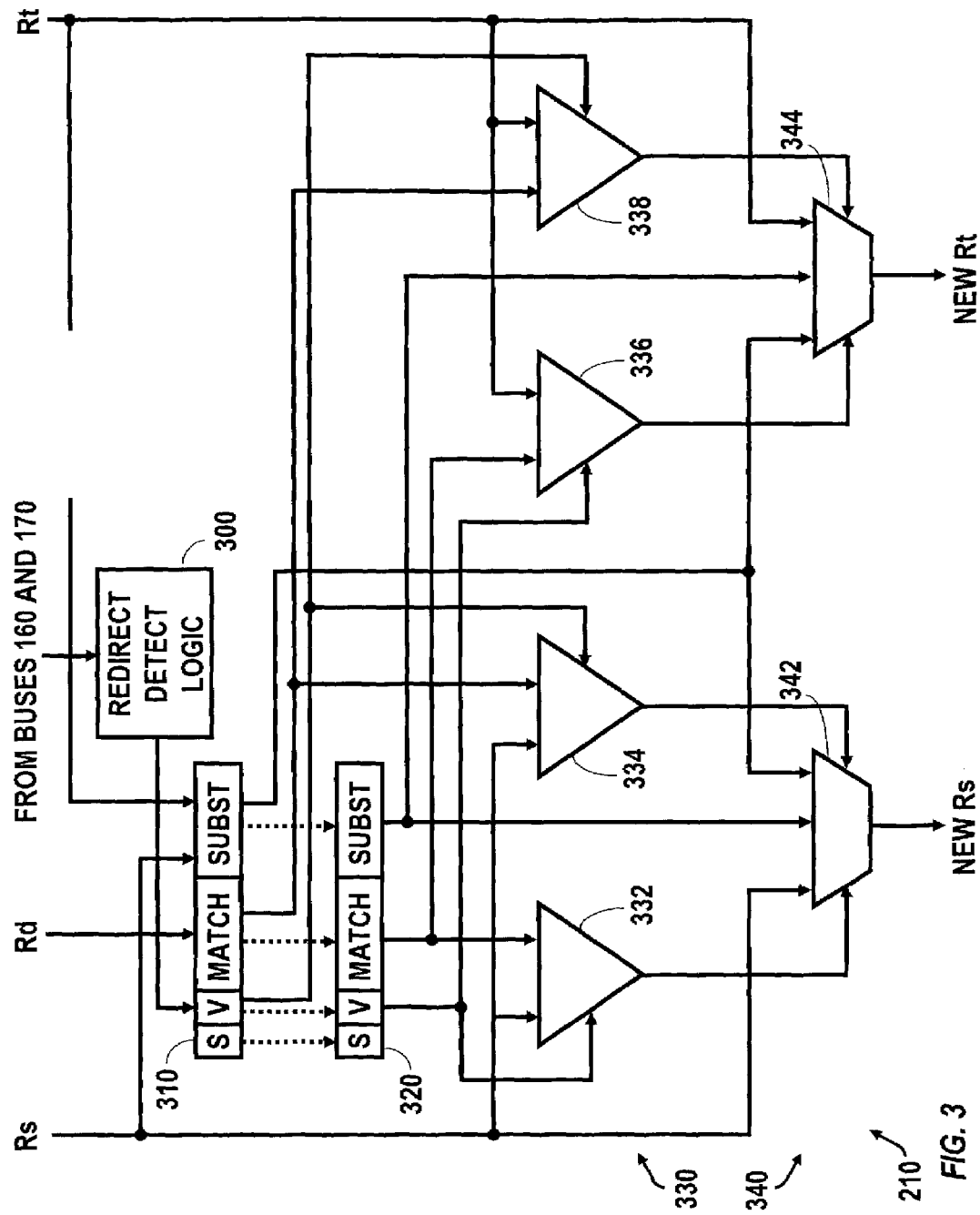
FIG. 3 illustrates a partial block diagram and partial logic diagram of the redirect logic circuit of FIG. 2.

Some details of the implementation of the mechanism described above are now shown in FIG. 3, which illustrates a partial block diagram and partial logic diagram of redirect logic circuit 210 of FIG. 2. Redirect logic circuit 210 includes generally a redirect detect logic circuit 300, a first redirect register 310, a second redirect register 320, a set of comparators 330, and a set of multiplexers 340. Redirect logic circuit 300 has an input connected to buses 160 and 170, and an output. The function of redirect logic circuit 300 is to detect those conditions that are suitable for register substitution as described above, and to create an entry in first redirect register 310 to detect a dependency on a successive instruction and cause the appropriate register substitution. In execution unit 200, buses 160 and 170 not only carry the values of operands Rs and Rt returned from the bypass logic circuit, but also signals decoded by bypass logic circuit 140 to indicate various states of the operands. For example, bypass logic circuit 140 includes hardware to detect when the exponent and fraction fields of a number are equal to zero or when the exponent field is equal to a predetermined value used to represent the value of one in that number format. For example, in general a value of zero is represented when both the exponent and fraction fields are zero. However execution unit 200 allows zero to be represented with only the exponent field equal to zero irrespective of the value of the fraction field. A value of one is represented by a number having a fraction field of zero and an exponent field having its predetermined value (127 for normal format and 1023 for double precision format). From this information in conjunction with the OP CODE field, redirect logic circuit 300 can detect the add to zero and multiply by one conditions.

First redirect register 310 has inputs for receiving register designator fields Rs, Rt, and Rd, an input connected to the output of redirect detect logic circuit 300, and an output. Second redirect register 320 has an input connected to the output of register 310, and three outputs. Each redirect register has the following fields: a sign bit field labeled "S", a valid bit field labeled "V", a register identifier match field labeled "MATCH" and a substitute field labeled "SUBST". The output of first redirect register 310 is shifted into second redirect register 320 in synchronism with a clock, not shown, that signals the advancement of the pipeline.

Set of comparators 330 includes four comparators 332, 334, 336, and 338. Comparator 332 has a first input for receiving register designator field Rs, a second input connected to the MATCH field of second redirect register 320, a control input connected to the V field of second redirect register 320, and an output Comparator 334 has a first input for receiving register designator field Rs, a second input connected to the output of the MATCH field of first redirect register 310, a control input connected to the V field of first redirect register 310, and an output. Comparator 336 has a first input for receiving register designator field Rt, a second input connected to the output of the MATCH field of second redirect register 320, a control input connected to the V field of second redirect register 320, and an output. Comparator 338 has a first input for receiving register designator field Rt, a second input connected to the output of the MATCH field of first redirect register 310, a control input connected to the V field of first redirect register 310, and an output.

Each comparator determines whether to substitute the value of an operand register of a previous or second previous instruction for an operand of the current instruction. Thus comparator 332 detects whether the destination register identifier Rd of the second previous instruction matches the first operand register identifier Rs of the current instruction.

Comparator 334 detects whether the destination register identifier Rd of the second previous instruction matches the second operand register identifier Rt of the current instruction. Comparator 336 detects whether the destination register identifier Rd of the previous instruction matches the first operand register identifier Rs of the current instruction. Comparator 338 detects whether the destination register identifier Rd of the previous instruction matches the second operand register identifier Rt of the current instruction.

Set of multiplexers 340 include multiplexers 342 and 344. Multiplexer 342 has a first input for receiving Rs, a second input connected to the SUBST field of second redirect register 320, a third input connected to the SUBST field of first redirect register 310, control inputs connected to the outputs of comparators 332 and 334, and an output for providing NEW Rs. Multiplexer 344 has a first input for receiving Rt, a second input connected to the SUBST field of first redirect register 310, a third input connected to the SUBST field of second redirect register 320, control inputs connected to the outputs of comparators 336 and 338, and an output for providing NEW Rt.

Multiplexers 342 and 344 include both multiplexing and logic circuitry to select the appropriate inputs to provide as the NEW Rs and NEW Rt values, respectively. If neither redirect register 310 nor 320 has a valid entry, then multiplexers 342 and 344 select Rs and Rt to provide as NEW Rs and NEW Rt, respectively. If only one of redirect register 310 and 320 has a valid entry, then multiplexers 342 and 344 select one of the SUBST values, corresponding to the valid redirect register entry, to provide as NEW Rs and NEW Rt, respectively if one of Rs and Rt match the contents of the corresponding MATCH field. If both redirect registers 310 and 320 have a valid entry, then multiplexers 342 and 344 select the SUBST values, corresponding to the valid redirect register entry, to provide as NEW Rs and NEW Rt, respectively, if Rs and/or Rt match the contents of the corresponding MATCH field. If both redirect registers 310 and 320 have a valid entry and the values of the MATCH fields are the same, then multiplexers 342 and 344 give priority to the instruction most recently issued, i.e., the multiplexer selects the input provided by the SUBST field of redirect register 310.

Note that normal dependency checking occurs in parallel in a normal dependency checking circuit, not shown, in ISSUE LOGIC circuit 110. The pipeline stalling reduction technique described herein operates to override normal dependency checking. The normal dependency checking circuit outputs two signals, designated "rs_stall" and "rt_stall", that detect any dependencies between prior issued but not yet completed instructions and the Rs and Rt operands, respectively, of the current instruction. Additional logic circuitry in REDIRECT LOGIC circuit 210, not shown in FIG. 2 or FIG. 3, generates a signal designated "kill_rs_stall" if either the output of comparator 342 or the output of comparator 344 is true, and generates a signal designated "kill_rt_stall" if the output of comparator 346 or the output of comparator 348 is true. ISSUE LOGIC circuit 110 then stalls the issuance of instruction 112 if either rs_stall gated by kill_rs_stall is true or rt_stall gated by kill_rt_stall is true.

Note that in the illustrated embodiment, redirect logic circuit 210 is shared between add unit 120 and multiply unit 130 because execution unit 200 is only single issue. For superscalar implementations, the logic would get complex, but the detection and substitution principles remain the same.

In other embodiments, the pipelined execution unit may have either two stages or more than three stages. To take advantage of the mechanism disclosed herein, the instruction need only have one operand identifier. Moreover the redirect detect logic circuit could examine the operands directly to detect particular conditions such as equal to zero or equal to one in other embodiments in which such information were not available via existing operand buses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. For use in a data processor having a pipelined execution unit, a method comprising the steps of:
    determining whether a first instruction is one of a class of instructions consisting of:
        an add instruction between a first operand stored in a operand register and a second operand having a value of zero, wherein a result of said add instruction is to be stored in a destination register; and
        a multiply instruction between said first operand stored in said operand register and a third operand having a value of one, wherein a result of said multiply instruction is to be stored in said destination register;
    receiving a second instruction that references said destination register before a completion of execution of said first instruction; and
    executing said second instruction using said operand register in place of said destination register in response to determining the first instruction is one of the class of instructions.

2. The method of claim 1 further comprising the step of associating said operand register with an operand register identifier of said second instruction that was previously associated with said destination register before said step of executing.

3. The method of claim 2 wherein said step of associating comprises the steps of:
    storing in a match field of a redirect register a register identifier of said destination register; and
    storing in a substitute field of said redirect register a register identifier of said operand register.

4. The method of claim 3 wherein said step of executing comprises the steps of:
    comparing an operand register identifier of said second instruction with the contents of said match field to provide a match signal;
    substituting the contents of said substitute field for said operand register identifier of said operand register to provide a new register identifier in response to the contents of said match field; and
    executing said second instruction using said new register identifier.

5. For use in a data processor having a pipelined execution unit, a method comprising the steps of:
    determining whether a first instruction is one of a class of instructions consisting of:

an add instruction between a first operand stored in an operand register and a second operand having a value of zero, wherein a result of said add instruction is to be stored in a destination register; and a multiply instruction between said first operand stored in said operand register and a third operand having a value of one, wherein a result of said multiply instruction is to be stored in said destination register;

if said first instruction is one of said class of instructions, storing a destination register identifier associated with said destination register in a match field of a redirect register, an operand register identifier associated with said operand register in a substitute field of said redirect register, and a valid bit in a valid field of said redirect register;

receiving a second instruction before a completion of execution of said first instruction;

comparing a first operand register identifier of said second instruction with the contents of said match field when said valid bit is in a predetermined logic state; and executing said second instruction using the contents of a register indicated by said substitute field without stalling said second instruction in the pipelined execution unit if said first operand register identifier matches the contents of said match field.

6. The method of claim 5 further comprising the steps of:
if said first instruction is one of said class of instructions, further storing a sign bit of said first instruction in a sign field of said redirect register; and selectively changing a sign bit of a result of execution of said second instruction in response to said sign bit of said redirect register.

7. The method of claim 5 further comprising the steps of:
comparing a second operand register identifier of said second instruction with the contents of said match field when said valid bit is in said predetermined logic state; and executing said second instruction using the contents of said register indicated by said substitute field without stalling said second instruction in the pipelined execution unit if either said first operand register identifier or said second operand register identifier matches the contents of said match field.

8. The method of claim 5 wherein said step of determining comprises the steps of:
detecting that a fraction field of said third operand has a value of zero; and detecting that an exponent field of said third operand has a maximum value.

9. The method of claim 5 wherein said step of executing comprises the steps of:
detecting a normal pipeline dependency if said first operand register identifier of said second instruction matches a destination register identifier of any one of a plurality of previous instructions including said first instruction; and performing said step of executing without stalling by overriding said normal pipeline dependency if said first operand register identifier of said second instruction matches the contents of said match field.

10. A data processor comprising:
an issue logic circuit having an output for providing first and second instructions in sequence, each instruction having at least an opcode, a first operand register identifier for a first operand, and a destination register identifier for a destination register;

a register file having a read port including a read address input and a read data output, and a write port;

a pipelined execution unit having a first input coupled to said output of said issue logic circuit, a second input coupled to said read data output of said register file, and an output coupled to said write port of said register file; and a redirect logic circuit having a first input coupled to said output of said issue logic circuit, a second input coupled to said read data output of said register file, and an output coupled to said read address input of said register file for selectively substituting said first operand register identifier of said first instruction for said first operand register identifier of said second instruction, wherein said redirect logic circuit substitutes said first operand register identifier of said first instruction for said first operand register identifier of said second instruction if it determines that as a result of execution of said first instruction said destination register of said first instruction will contain the contents of said first operand register of said first instruction and wherein said redirect logic circuit further comprises:

a redirect detect logic circuit having an output terminal:

a first redirect register coupled to said output of said issue logic circuit and associated with a stage of said pipelined execution unit, having at least a valid field coupled to said output terminal of said redirect detect logic circuit, a match field for receiving said destination register identifier, and a substitute field for receiving a selected one of said first operand register identifier and a second operand register identifier;

a first comparator having a first input terminal for receiving said first operand register identifier of said second instruction, a second input terminal coupled to said match field of said first redirect register, a control input terminal coupled to said valid field of said first redirect register, and an output terminal: and a first multiplexer having a first input terminal for receiving said first operand register identifier, a second input terminal coupled to said substitute field of said first redirect register, a control input terminal coupled to said output terminal of said first comparator, and an output terminal for providing a new register identifier for said first operand of said second instruction.

11. The data processor of claim 10 wherein said redirect logic circuit further comprises:
a second redirect register having an input terminal coupled to an output terminal of said first redirect register, and having a valid field, a match field, and a substitute field coupled to corresponding fields in said first redirect register; and a second comparator having a first input terminal for receiving said first operand register identifier of said second instruction, a second input terminal coupled to said match field of said second redirect register, a control input terminal coupled to said valid field of said second redirect register, and an output terminal;

wherein said first multiplexer further has a third input terminal coupled to said substitute field of said second redirect register, and a second control input terminal coupled to said output terminal of said second comparator, wherein said first multiplexer provides said new register identifier for said first operand of said second instruction to said output terminal in dependence on signals at said output terminals of both said first and second comparators.

12. The data processor of claim 10 wherein said redirect logic circuit further comprises:
- a third comparator having a first input terminal for receiving said second operand register identifier of said second instruction, a second input terminal coupled to said match field of said first redirect register, a control input terminal coupled to said valid field of said first redirect register, and an output terminal; and
- a second multiplexer having a first input terminal for receiving said second operand register identifier, a second input terminal coupled to said substitute field of said first redirect register, a control input terminal coupled to said output terminal of said third comparator, and an output terminal for providing a new register identifier for said second operand of said second instruction.

13. The data processor of claim 12 wherein said redirect logic circuit further comprises:
- a second redirect register having an input terminal coupled to said output terminal of said first redirect register, and having a valid field, a match field, and a substitute field coupled to corresponding fields in said first redirect register; and
- a fourth comparator having a first input terminal for receiving said second operand register identifier of said second instruction, a second input terminal coupled to said match field of said second redirect register, a control input terminal coupled to said valid field of said second redirect register, and an output terminal;

wherein said second multiplexer further has a third input terminal coupled to said substitute field of said second redirect register, and a second control input terminal coupled to said output terminal of said second comparator, wherein said second multiplexer provides said new register identifier for said second operand of said second instruction to said output terminal in dependence on signals at said output terminals of both said third and fourth comparators.

14. The data processor of claim 10 wherein a second input of said pipelined execution unit is coupled to said read data output of said register file through a bypass circuit, said output of said pipelined execution unit is coupled to said write port of said register file through said bypass circuit, and said second input of said redirect logic circuit is coupled to said read data output of said register file through said bypass circuit.

15. The data processor of claim 10 wherein said instruction further includes a second operand register identifier for a second operand.

* * * * *